Feb. 12, 1952 W. B. KOCHNER ET AL 2,585,255
MIXER
Filed Oct. 29, 1949 2 SHEETS—SHEET 1

Inventors
William B. Kochner
Donald F. McCarron
By Bair & Freeman
Attys.

Feb. 12, 1952 — W. B. KOCHNER ET AL — 2,585,255
MIXER
Filed Oct. 29, 1949 — 2 SHEETS—SHEET 2
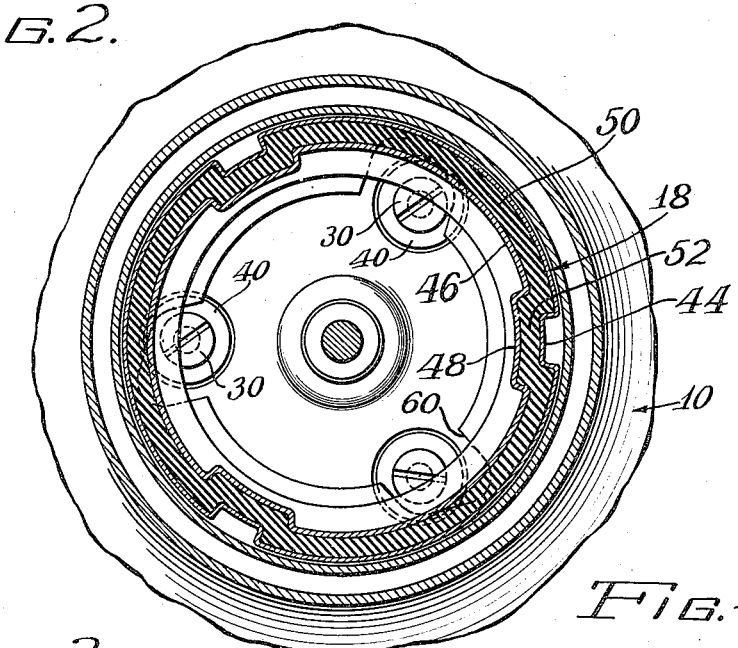
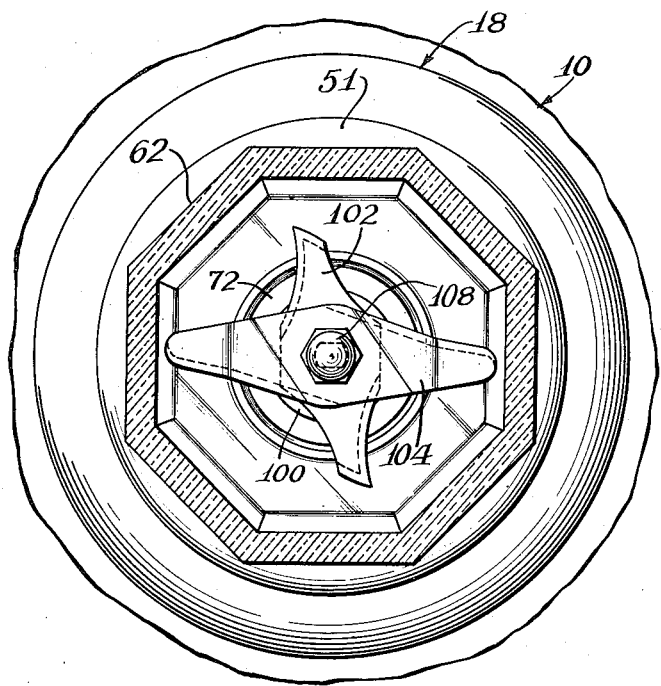
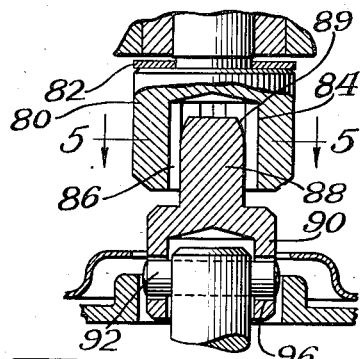
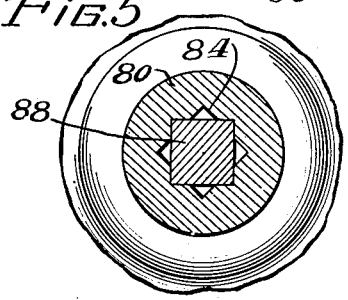
Inventors:
William B. Kochner
Donald F. McCarron
By Bair & Freeman
Attys.

Patented Feb. 12, 1952

2,585,255

UNITED STATES PATENT OFFICE 2,585,255

MIXER

William B. Kochner and Donald F. McCarron, St. Louis, Mo., assignors to Knapp-Monarch Company, St. Louis, Mo., a corporation of Delaware Application October 29, 1949, Serial No. 124,326

7 Claims. (Cl. 259—108)

This invention relates to a mixer for liquids and semi-solids such as the type known as a "Liquidizer."

One object of the invention is to provide a mixer which includes a bowl unit that is readily detachable in relation to a power unit, the mixer bowl unit including bowl and mixing and/or cutting knives for mixing, cutting, blending, grinding and similar operations on liquids and semi-solids placed in the mixer bowl, the arrangement being such that when the bowl unit is associated with the power unit, a mechanical connection is had between its knives and the motor shaft of the power unit for operating the knives from the motor.

Another object is to provide a mixer bowl unit including a bowl and the necessary mixing and/or cutting knives together with an extension shaft for the knives carried by the bowl unit and capable of ready coupling connection with the motor shaft of the power unit.

Still another object is to provide a bowl unit which has a base covered with synthetic rubber or the like and cooperable with the top of the power unit housing so as to be supported thereby and insulated against vibration by the synthetic rubber base, the construction being such that means is provided to prevent the bowl unit from rotation relative to the power unit so that the motor of the power unit can rotate the blades of the bowl unit without rotating the bowl for containing the liquid or other ingredients worked upon.

A further object is to provide means for resiliently suspending the motor in the power unit so as to isolate the vibration thereof from the housing for the power unit.

Still a further object is to provide a readily interchangeable bowl unit for cooperation with a power unit so that the bowl unit can be removed after the mixing or other operation has been performed and its contents poured into a glass or the like, and any one of several bowl units may be placed on the power unit interchangeably with respect to each other.

With these and other objects in view, our invention consists in the construction, arrangement and combination of the various parts of our mixer bowl, whereby the objects contemplated are attained, as hereinafter more fully set forth, pointed out in our claims and illustrated in the accompanying drawings, wherein:

Figure 2 is a horizontal sectional view on the line 2—2 of Figure 1 to show the coaction of the base of the bowl unit with the top of the power unit.

Figure 3 is a horizontal sectional view on the line 3—3 of Figure 1 showing a plan view of the cutter or mixer blades.

Figure 4 is an enlarged vertical sectional view on the line 4—4 of Figure 1 showing a coupling arrangement between a power shaft and an extension shaft; and Figure 5 is a sectional view on the line 5—5 of Figure 4.

Figure 1:
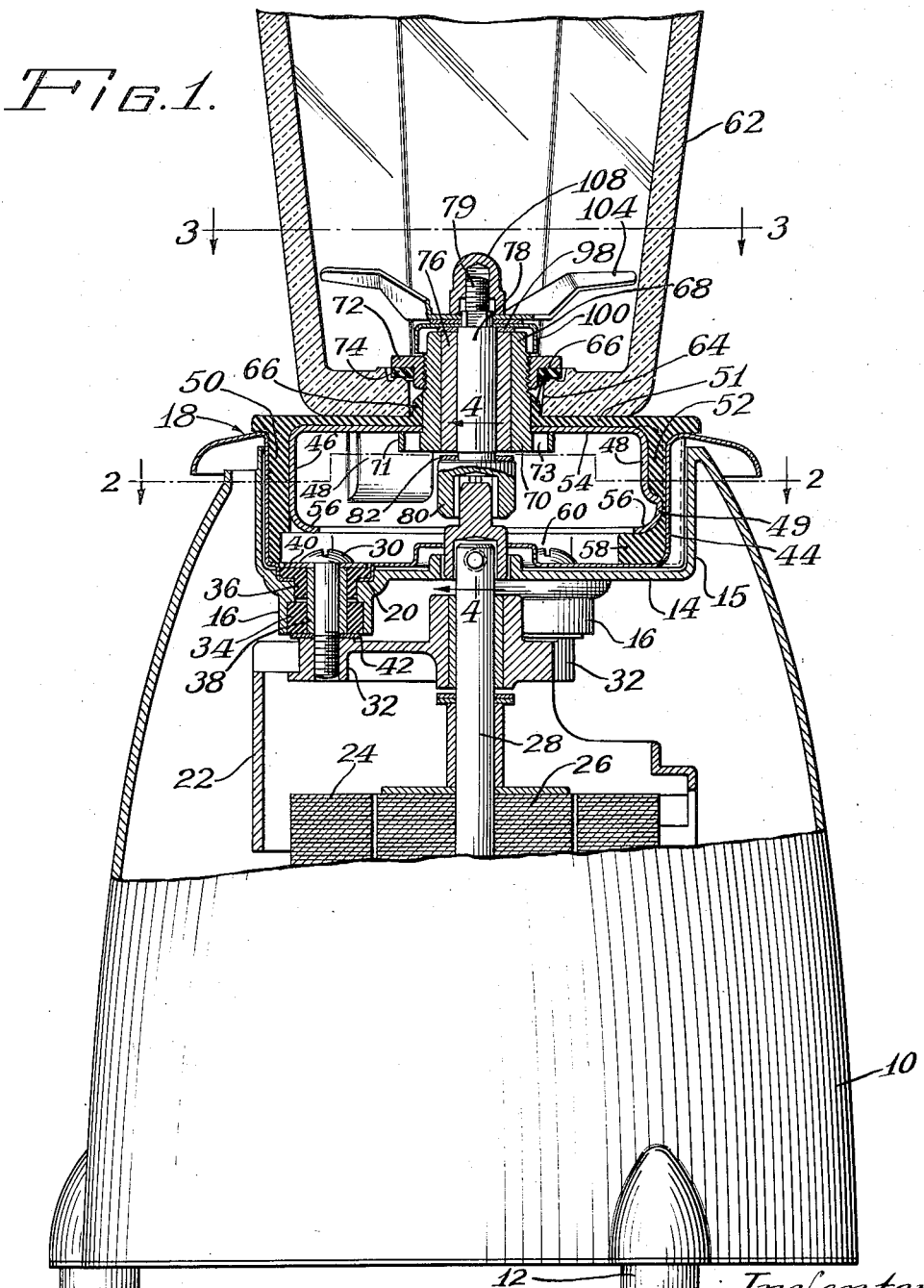
Figure 1 is a vertical sectional view partially in side elevation showing our mixer with the exception of the upper portion of the bowl unit which has been broken away to conserve space on the drawing.

On the accompanying drawings I have used the reference numeral 10 to indicate a housing for a power unit which housing is supported by three feet of rubber or the like illustrated at 12. The housing 10 has a top wall 14 from which three bosses 16 depend and the wall 14 together with an annular wall 15 comprise a socket in which we mount a formed sheet metal pan-like receptacle 18. The receptacle 18 has three depending sockets 20 mounted in the bosses 16.

A motor frame 22 is supported in relation to the bosses 16 as will hereinafter be described and includes the usual stator 24 and rotor 26, the rotor being secured to a power shaft 28. Adjacent each boss 16, the motor frame 22 has a threaded boss 32 to receive a mounting screw 30. This screw extends through a pair of rubber-like sleeves 34 and 36 surrounding a metal sleeve 38 at the ends of which washers 40 and 42 are located. The screws 30 when tightened down, hold the elements 38, 40 and 42 as a unit with respect to the motor frame 22 and thus insulated vibrationally from the bosses 16 by the sleeves 34 and 36. In this way, the transmission of vibration from the motor to the housing 10 is minimized.

The receptacle 18 has three inward projections 44 and the receptacle is adapted to receive a sheet metal base member 46 which is covered with a molded synthetic rubber sleeve 50 having a top wall 51. The base member 46 has three indentations 48 and the rubber sleeve 50 has three offset portions 52 confined between these indentations and the projections 44 of the receptacle 18. At the lower end of each indentation 48, the sheet metal of the base member 46 projects as at 49 in Figure 1 to positively prevent rotation of the base member 46 relative to the receptacle 18 which rotation is initially prevented in a resilient manner by the offset portions 52 of the sleeve 50.

The base member 46 has a top wall 54 adjacent the wall 51 of the sleeve 50 and an inturned flange 56 under which a portion 58 of the sleeve 50 extends. The portion 58 is in the form of an inturned flange and is provided with three notches 60 to clear the heads of the screws 30 as shown in Figure 2.

A bowl 62 is mounted on the base 46 by means of a sleeve 68 having a flange 70 at its lower end engaging the wall 54 of the base member 46 and the flange being provided with a pair of spanner wrench openings 73. A nut 72 is threaded on the sleeve 68 for securing the bowl 62 to the base 46 and beneath this nut a gasket 74 serves to engage the lower wall of the bowl 62 which may be of glass and prevent its breakage as well as prevent leakage at this point. The wall 51 also extends upwardly along the sleeve 68 as at 66 to aid in the prevention of leakage.

The sleeve 68 contains bushing type bearings 76 for an extension shaft 78 to rotate it. The lower end of this shaft has a head 80 provided with an eight-cornered socket 86 adapted to receive a square upper end 88 of a coupling member having a head 90. The head 90 is provided with openings 96 in which a pin 92 is located, the pin being a tight fit in the upper end of the motor shaft 28 and a loose fit in the opening 96. Likewise the socket in the head 90 is a loose fit with relation to the shaft 28 to permit slight mis-alignment of the shaft 78 relative to the shaft 28 which might occur because of manufacturing tolerances without producing a binding action during the operation of the mixer.

The upper end of the extension shaft 78 is shouldered down and threaded as indicated at 79 to be received in a nut 108. This nut holds a lower blade 102 and an upper blade 104 against a cupped washer 100 over a thrust washer 98 and the upper end of the sleeve 68. Another thrust washer 82 is provided between the head 80 and the bearing sleeve 76.

*Practical operation*

Our mixer is so constructed that the bowls 62 are interchangeable by reason of the bowl unit being readily removable with relation to the power unit. Whenever the bowl unit is removed it carries with it the cutter or mixer blades and the base member 46—50 as well as the coupling member 80. When the bowl unit is replaced it is merely necessary to see that the offsets 52 of the rubber sleeve 50 match the projections 44 of the receptacle 18 and as the base of the bowl unit is lowered into the receptacle the upper end of the square coupling member 88, being rounded off as at 89, will find its way into the eight-cornered socket 86. Thereafter the motor 24—26 may be energized and will rotate the cutters 102 and 104.

Vibration is minimized by the sleeves 34 and 36 isolating the motor vibration from the power unit housing 10 and the sleeve 50 isolating what additional vibration there might be in the housing 10 from the bowl 62. The result is smooth and quiet operation of the mixer in addition to the possibility of readily pouring out the contents of the bowl units or interchanging them with respect to the power unit as desired.

Some changes may be made in the construction and arrangement of the parts of our mixer bowl without departing from the real spirit and purpose of our invention, and it is our intention to cover by our claims any modified forms of structure or use of mechanical equivalents which may be reasonably included within their scope.

We claim as our invention:

1. A bowl unit comprising a bowl, an extension shaft rotatably carried thereby, a base member attached to said bowl, a sleeve for journalling said shaft, said sleeve extending through the bottom of said bowl, said base member being covered with rubber or the like having one portion between said base member and said bowl and another portion thereof being adapted for reception in a supporting socket of a power unit, said shaft having a coupling member for coaction with a companion coupling member on the shaft of a power unit.

2. A mixer unit comprising a bowl, a base member for said bowl, a sleeve through the bottom of said bowl, and extension shaft journalled in said sleeve, said base member having a rubber-like covering of inverted cup conformation and sandwiched at its top face between the base member and the bowl and at its skirt portions adapted for snug reception between the base member and the supporting socket of a power unit, and a coupling member on said extension shaft for coaction with a power shaft of the power unit, said coupling member permitting vibration of said power shaft without vibrating said mixer unit and preventing relative rotation of said extension and power shafts.

3. In a mixer liquids and the like, a power unit comprising a housing having a socket member therein, a motor in said housing and a coupling member on the shaft of said motor, a bowl unit comprising a bowl and a base secured together with an inverted cup shaped element of resilient material sandwiched therebetween and having socket portions extending down over the base to be received snugly in the socket member, means for preventing rotation of said base relative to said socket, an extension shaft rotatably carried by said bowl unit, a mixer blade on the end of said extension shaft within said bowl, and a companion coupling member on the lower end of said extension shaft for coaction with said first coupling member when said bowl unit base is received in said socket, the coaction elements of said coupling members comprising a projection and a socket of other-than-round cross-section having the projection fitting the socket sufficiently close to minimize lost play and provide a positive drive between the two.

4. A mixer comprising a power unit housing having a socket in its upper end, a motor in said housing having a coupling member in said socket, a bowl unit comprising a bowl and a base member to be received in said socket, said base member having a rubber-like covering of inverted cup conformation and sandwiched at its top face between the base and the bowl and having skirt portions adapted for snug reception in said socket to minimize the transmission of vibration from said socket to said base and from said base to said bowl, said rubber-like cover being of such size as to fit said socket without play, said bowl unit including an extension shaft having mixing and/or cutting blades thereon and a coupling member for cooperation with said first mentioned coupling member, said coupling members providing a positive drive from said motor to said extension shaft.

5. A mixer comprising a power unit housing having a socket in its upper end, a motor in said housing resiliently suspended in relation thereto and having a coupling member in said socket, a bowl unit comprising a bowl and a base member to be received in said socket, said base member being covered by an inverted cup-shaped element of rubber-like material sandwiched between the bowl and the base and extending down over the edge of the base to minimize the transmission of vibration from said housing to said base, said covered base member snugly fitting said socket, said bowl unit including an extension shaft rotatably carried thereby and a coupling member on said extension shaft for cooperation with said coupling member in said socket, said coupling members permitting only slight play, limiting rotation of said motor with respect to said extension shaft during operation of said mixer to only that permitted by such play and affording a positive drive from said motor through said coupling members to said extension shaft.

6. In a mixer, a housing having a socket in its upper end, a motor in said housing having a coupling member in said socket, a bowl unit comprising a bowl, a base member to be received in said socket, said base member being covered with rubber-like material to minimize the transmission of vibration from the housing socket to said base, said base member comprising a metal liner for said rubber-like material, a sleeve for holding said liner to said bowl, an extension shaft through said sleeve, and a coupling member on said shaft for cooperation with said first mentioned coupling member.

7. A bowl unit comprising a bowl having a hole through its bottom, an extension shaft, a sleeve through said hole for journalling said extension shaft, a base covered with resilient material and adapted for reception in a supporting socket of a power unit, said sleeve serving to connect said bowl to said base with said resilient material between the two and said shaft having a coupling member for driving coaction with the power unit.

WILLIAM B. KOCHNER.
DONALD F. McCARRON.

REFERENCES CITED

The following references are of record in the file of this patent:

UNITED STATES PATENTS

| Number | Name | Date |
|---|---|---|
| 2,226,372 | Cravaritis | Dec. 24, 1940 |
| 2,304,476 | Poplawski | Dec. 8, 1942 |
| 2,309,347 | Landgraf | Jan. 26, 1943 |